(12) United States Patent
Matsuura et al.

(10) Patent No.: US 11,402,296 B2
(45) Date of Patent: Aug. 2, 2022

(54) OPTICAL FIBER CHARACTERISTICS MEASUREMENT APPARATUS AND OPTICAL FIBER CHARACTERISTICS MEASUREMENT METHOD

(71) Applicant: Yokogawa Electric Corporation, Tokyo (JP)

(72) Inventors: Satoshi Matsuura, Tokyo (JP); Yoshihiro Kumagai, Tokyo (JP)

(73) Assignee: Vokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/273,152

(22) PCT Filed: Aug. 26, 2019

(86) PCT No.: PCT/JP2019/033219
§ 371 (c)(1),
(2) Date: Mar. 3, 2021

(87) PCT Pub. No.: WO2020/050076
PCT Pub. Date: Mar. 12, 2020

(65) Prior Publication Data
US 2021/0318147 A1 Oct. 14, 2021

(30) Foreign Application Priority Data
Sep. 7, 2018 (JP) .............................. JP2018-167895

(51) Int. Cl.
*G01M 11/00* (2006.01)
*G01D 5/353* (2006.01)
(Continued)

(52) U.S. Cl.
CPC ....... *G01M 11/333* (2013.01); *G01D 5/35364* (2013.01); *G01M 11/33* (2013.01); *G01K 11/322* (2021.01); *G01L 1/242* (2013.01)

(58) Field of Classification Search
CPC .. G01D 5/35364; G01K 11/322; G01L 1/242; G01M 11/30; G01M 11/31; G01M 11/33;
(Continued)

(56) References Cited

U.S. PATENT DOCUMENTS 6,710,863 B2 * 3/2004 Hotate ................... G01M 11/39
356/73.1
7,948,614 B2 * 5/2011 Hotate ................. G01M 11/333
356/73.1
(Continued)

FOREIGN PATENT DOCUMENTS

JP 06-109589 A 4/1994
JP 3607930 B2 1/2005
(Continued)

OTHER PUBLICATIONS

Kazuki Washiyama et al., "High Speed BOCDA Measurement of Strain Distribution Using Longitudinal Sweep Method", Proceedings of The 2013 IEICE General Conference, Mar. 21, 2013, p. 223.

*Primary Examiner* — Gordon J Stock, Jr.
(74) *Attorney, Agent, or Firm* — Sughrue Mion, PLLC (57) ABSTRACT

An optical fiber characteristic measurement apparatus (1) includes: a light source (11) configured to output a laser beam of which frequency is modulated; an incident part (12, 13, 14, and 15) configured to make the laser beam output from the light source be incident from one end and another end of an optical fiber (FUT) as continuous light (L1) and pulsed light (L2), respectively; a light detector (16) configured to detect light projected from the optical fiber and output a detection signal (D1); and a detector (17 and 18a) configured to detect, in a first period (T1) in which scattering light based on the continuous light and the pulsed light is projected from the optical fiber and a second period (T2) shorter than the first period, in which the scattering light is not projected from the optical fiber, the scattering light based on integrated values acquired by integrating the detection signal for a predetermined time.

20 Claims, 6 Drawing Sheets

(51) Int. Cl.
*G01K 11/322* (2021.01)
*G01L 1/24* (2006.01)

(58) Field of Classification Search
CPC ............. G01M 11/331; G01M 11/332; G01M 11/333; G01M 11/334; G01M 11/335; G01M 11/336; G01M 11/337; G01M 11/338
USPC ........................................................ 356/73.1
See application file for complete search history.

(56) References Cited

U.S. PATENT DOCUMENTS

| | | | |
|---|---|---|---|
| 8,724,101 B2 * | 5/2014 | Hotate | ................... G01M 11/33 356/73.1 |
| 9,109,977 B2 * | 8/2015 | Kishi | ...................... G01M 11/39 |
| 9,983,095 B2 * | 5/2018 | Matsuura | ............ G01D 5/35364 |
| 2003/0007142 A1 | 1/2003 | Hotate et al. | |
| 2010/0040108 A1 | 2/2010 | Sasaoka et al. | |
| 2013/0308123 A1 | 11/2013 | Kishi et al. | |

FOREIGN PATENT DOCUMENTS

| | | |
|---|---|---|
| JP | 2012-159387 A | 8/2012 |
| JP | 5654891 B1 | 1/2015 |
| WO | 2008/084637 A1 | 7/2008 |

* cited by examiner

OPTICAL FIBER CHARACTERISTICS MEASUREMENT APPARATUS AND OPTICAL FIBER CHARACTERISTICS MEASUREMENT METHOD

CROSS REFERENCE TO RELATED APPLICATIONS

This application is a National Stage of International Application No. PCT/JP2019/033219, filed Aug. 26, 2019, claiming priority to Japanese Patent Application No. 2018-167895, filed Sep. 7, 2018, the entire contents of each of which are herein incorporated by reference in their entireties.

TECHNICAL FIELD

The present invention relates to an optical fiber characteristics measurement apparatus and an optical fiber characteristics measurement method.

BACKGROUND ART

An optical fiber characteristics measurement apparatus is an apparatus that makes continuous light or pulsed light be incident into a measurement optical fiber, receives scattering light or reflected light generated in the measurement optical fiber, and measures a temperature distribution, a strain distribution, and other characteristics of the measurement optical fiber in the longitudinal direction. In this optical fiber characteristics measurement apparatus, the measurement optical fiber itself is used as a sensor because received scattering light or reflected light changes according to physical quantities (e.g., temperature and strain) that affect the measurement optical fiber.

As such an optical fiber characteristics measurement apparatus, there is an apparatus using Brillouin optical correlation domain analysis (BOCDA). This BOCDA optical fiber characteristics measurement apparatus makes frequency-modulated continuous light (pump light and probe light) be incident from both ends of a measurement optical fiber and measures characteristics of the measurement optical fiber using the property that the probe light is amplified according to stimulated Brillouin scattering (SBS) at a position at which modulation phases of the pump light and the probe light are consistent with each other (a position at which a correlation peak appears).

In the BOCDA optical fiber characteristics measurement apparatus, modulation frequency and delay amounts of pump light and probe light are adjusted such that only one correlation peak is present in a measurement optical fiber. In addition, in the BOCDA optical fiber characteristics measurement apparatus, characteristics of the measurement optical fiber in the longitudinal direction are measured by manipulating the modulation frequency of the pump light and the probe light to move position of correlation peak in the measurement optical fiber and receiving probe light (hereinafter referred to as stimulated Brillouin scattering light) amplified at the position.

Here, in the BOCDA optical fiber characteristics measurement apparatus, there are cases in which a plurality of correlation peaks appear in a measurement optical fiber even though modulation frequencies and delay amounts of pump light and probe light are adjusted when the length of the measurement optical fiber increases. In such cases, it is necessary to select one of a plurality of correlation peaks, cause only stimulated Brillouin scattering light at a position at which the selected correlated peak appears to be extracted, and cause stimulated Brillouin scattering light at positions at which other correlated peaks appear not to be extracted. As a method of selecting a correlation peak, there is a method called a time gate method.

Patent Literature 1 and 2 below disclose conventional BOCDA optical fiber characteristics measurement apparatuses using the time gate method. In these optical fiber characteristics measurement apparatuses, frequency-modulated continuous light (probe light) and pulsed light (pump light) respectively are incident from one end and the other end of a measurement optical fiber such that stimulated Brillouin scattering lights at positions of a plurality of correlation peaks appearing in the measurement optical fiber are generated at different timings. Then, a timing of receiving stimulated Brillouin scattering light is adjusted such that only stimulated Brillouin scattering light at a position at which a selected correlation peak appears is extracted.

In addition, the optical fiber characteristics measurement apparatus disclosed in Patent Literature 2 below promotes improvement of spatial resolution and reduction of costs without causing deterioration of measurement accuracy and deterioration of stability and repeatability by synchronously detecting a detection signal of light projected from a measurement optical fiber using a synchronization signal having a predetermined period. Specifically, synchronous detection is performed using a synchronization signal having a period of ("time $t_{rt}$ required for pump light to reciprocate through measurement optical fiber"+"width of pump light (time width) $t_{pw}$")×2.

CITATION LIST

Patent Literature

[Patent Literature 1]
Japanese Patent No. 3607930
[Patent Literature 2]
Japanese Patent No. 5654891

SUMMARY OF INVENTION

Technical Problem

However, in the above-described optical fiber characteristics measurement apparatus disclosed in Patent Literature 2, synchronous detection is performed using a synchronization signal having a predetermined period (time of ("time $t_{rt}$ required for pump light to reciprocate in measurement optical fiber"+"width of pump light (time width) $t_{pw}$")×2). Accordingly, in the conventional optical fiber characteristics measurement apparatus, unless the aforementioned predetermined period elapses from input of one pump light to a measurement optical fiber, the next pump light cannot be input to the measurement optical fiber. Accordingly, the conventional optical fiber characteristics measurement apparatus has a problem that a time required for measurement considerably increases when characteristics of the measurement optical fiber in the longitudinal direction are intended to be measured over a wide range.

In addition, the time $t_{rt}$ required for pump light to reciprocate in the measurement optical fiber increases as the length of the measurement optical fiber increases. Here, when the time width $t_{pw}$ of the pump light is less than the time tit required for the pump light to reciprocate in the measurement optical fiber, a measurement value of stimulated Brillouin scattering light decreases. Then, there is also a problem that an S/N ratio (signal-to-noise ratio) that is a ratio of the measurement value of stimulated Brillouin scattering light to noise decreases and thus measurement accuracy deteriorates.

An object of the present invention in view of the aforementioned circumstances is to provide an optical fiber characteristics measurement apparatus and an optical fiber characteristics measurement method capable of reducing a time required to measure characteristics of a measurement optical fiber and improving measurement accuracy compared to conventional technologies.

Solution to Problem

To solve the aforementioned problems, an optical fiber characteristic measurement apparatus according to one aspect of the present invention includes: a light source (11) configured to output a laser beam of which frequency is modulated; an incident part (12, 13, 14, and 15) configured to make the laser beam output from the light source be incident from one end and another end of an optical fiber (FUT) as continuous light (L1) and pulsed light (L2), respectively; a light detector (16) configured to detect light projected from the optical fiber and output a detection signal (D1); and a detector (17 and 18a) configured to detect, in a first period (T1) in which scattering light based on the continuous light and the pulsed light is projected from the optical fiber and a second period (T2) shorter than the first period, in which the scattering light is not projected from the optical fiber, the scattering light based on integrated values acquired by integrating the detection signal for a predetermined time.

Furthermore, in the optical fiber characteristics measurement apparatus according to one aspect of the present invention, the detector includes: a timing adjuster (17a) configured to cut out the detection signal using the predetermined time as a unit; and an integrator (17c) configured to integrate the detection signal which has been cut out by the timing adjuster for the predetermined time.

Furthermore, in the optical fiber characteristics measurement apparatus according to one aspect of the present invention, the detector further includes a calculator (18a) configured to obtain the scattering light by performing a predetermined calculation on an integrated value of the integrator.

Furthermore, in the optical fiber characteristics measurement apparatus according to one aspect of the present invention, the detector further includes: a polarity reversing part (17b) configured to reverse a polarity of the detection signal which has been cut out by the timing adjuster in any one of the first period and the second period, and the calculator is configured to obtain the scattering light by adding an integrated value acquired in the first period to an integrated value acquired in the second period.

Furthermore, in the optical fiber characteristics measurement apparatus according to one aspect of the present invention, the timing adjuster is configured to cut out the detection signal using the predetermined time as a unit from a plurality of different points in time in the first period, and the integrator is configured to individually integrate each of detection signals which have been cut out by the timing adjuster.

Furthermore, in the optical fiber characteristics measurement apparatus according to one aspect of the present invention, the first period is a period from when the pulsed light is incident into the optical fiber to when a time obtained by adding a time width ($t_{pw}$) of the pulsed light to a time ($t_{rt}$) required for the pulsed light to reciprocate through the optical fiber elapses.

Furthermore, in the optical fiber characteristics measurement apparatus according to one aspect of the present invention, the second period is a period from a point in time at which the first period has elapsed to when the time width of the pulsed light elapses.

Furthermore, in the optical fiber characteristics measurement apparatus according to one aspect of the present invention, the predetermined time is the time width of the pulsed light.

Furthermore, in the optical fiber characteristics measurement apparatus according to one aspect of the present invention, the incident part includes a shifting part (13) configured to shift an optical frequency of any one of the continuous light and the pulsed light, and the scattering light is stimulated Brillouin scattering light.

Furthermore, in the optical fiber characteristics measurement apparatus according to one aspect of the present invention, the shifting part includes: a microwave generator (13a) configured to output microwaves; and a modulator (13b) configured to shift the optical frequency of any one of the continuous light and the pulsed light in response to the microwaves output from the microwave generator.

An optical fiber characteristics measurement method according to one aspect of the present invention includes: outputting, by a light source (11), a laser beam of which frequency is modulated; making, by an incident part (12, 13, 14, and 15), the laser beam output from the light source be incident from one end and another end of an optical fiber (FUT) as continuous light (L1) and pulsed light (L2), respectively; detecting, by a light detector (16), light projected from the optical fiber and outputting a detection signal (D1); and detecting, by a detector (17 and 18a), in a first period (T1) in which scattering light based on the continuous light and the pulsed light is projected from the optical fiber and a second period (T2) shorter than the first period, in which the scattering light is not projected from the optical fiber, the scattering light based on integrated values acquired by integrating the detection signal for a predetermined time.

Furthermore, in the optical fiber characteristics measurement method according to one aspect of the present invention, the detector includes a timing adjuster (17a) and an integrator (17c), and the optical fiber characteristics measurement method further includes: cutting out, by the timing adjuster, the detection signal using the predetermined time as a unit; and integrating, by the integrator, the detection signal which has been cut out by the timing adjuster for the predetermined time.

Furthermore, in the optical fiber characteristics measurement method according to one aspect of the present invention, the detector further includes a calculator (18a), and the optical fiber characteristics measurement method further includes: obtaining, by the calculator, the scattering light by performing a predetermined calculation on an integrated value of the integrator.

Furthermore, in the optical fiber characteristics measurement method according to one aspect of the present invention, the detector further includes a polarity reversing part (17b), and the optical fiber characteristics measurement method further includes: reversing, by the polarity reversing part, a polarity of the detection signal which has been cut out by the timing adjuster in any one of the first period and the second period; and obtaining, by the calculator, the scattering light by adding an integrated value acquired in the first period to an integrated value acquired in the second period.

Furthermore, the optical fiber characteristics measurement method according to one aspect of the present invention further includes: cutting out, by the timing adjuster, the detection signal using the predetermined time as a unit from a plurality of different points in time in the first period; and individually integrating, by the integrator, each of detection signals which have been cut out by the timing adjuster.

Furthermore, in the optical fiber characteristics measurement method according to one aspect of the present invention, the first period is a period from when the pulsed light is incident into the optical fiber to when a time obtained by adding a time width ($t_{pw}$) of the pulsed light to a time ($t_{rt}$) required for the pulsed light to reciprocate through the optical fiber elapses.

Furthermore, in the optical fiber characteristics measurement method according to one aspect of the present invention, the second period is a period from a point in time at which the first period has elapsed to when the time width of the pulsed light elapses.

Furthermore, in the optical fiber characteristics measurement method according to one aspect of the present invention, the predetermined time is the time width of the pulsed light.

Furthermore, in the optical fiber characteristics measurement method according to one aspect of the present invention, the incident part includes a shifting part (13), the optical fiber characteristics measurement method further includes: shifting, by the shifting part, an optical frequency of any one of the continuous light and the pulsed light, and the scattering light is stimulated Brillouin scattering light.

Furthermore, in the optical fiber characteristics measurement method according to one aspect of the present invention, the shifting part includes a microwave generator (13a) and a modulator (13b), and the optical fiber characteristics measurement method further includes: outputting microwaves by the microwave generator; and shifting, by the modulator, optical frequency of any one of the continuous light and the pulsed light in response to the microwaves output from the microwave generator.

Further features and aspects of the present disclosure will become apparent from the following detailed description of exemplary embodiments with reference to the attached drawings.

Advantageous Effects of Invention

According to the present invention, it is possible to obtain the effects of being capable of reducing a time required to measure characteristics of a measurement optical fiber and improving measurement accuracy compared to conventional technologies.

DESCRIPTION OF EMBODIMENTS

Hereinafter, an optical fiber characteristics measurement apparatus and an optical fiber characteristics measurement method according to embodiments of the present invention will be described with reference to the drawings.

First Embodiment

<Configuration of Optical Fiber Characteristics Measurement Apparatus>

Figure 1:
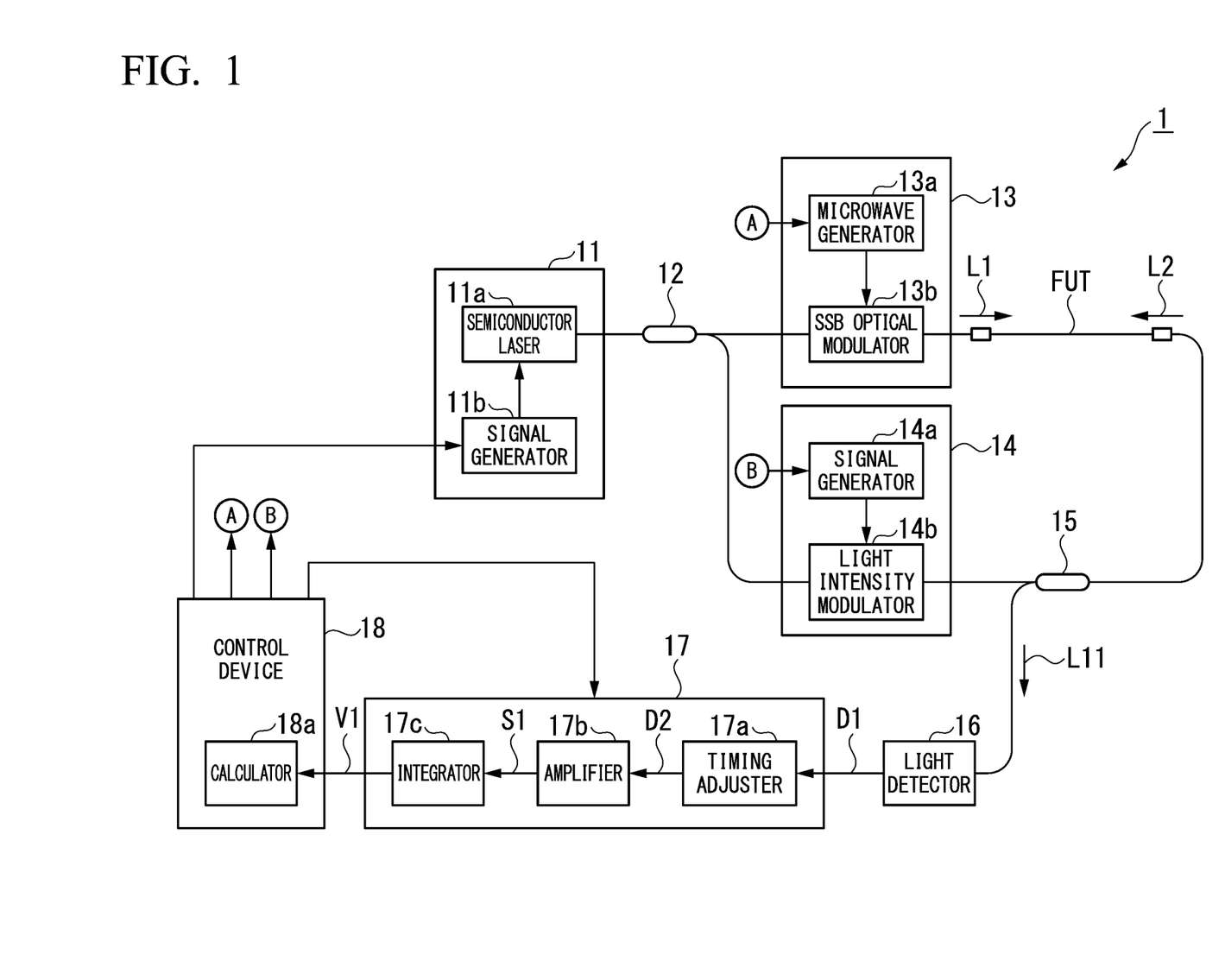
FIG. 1 is a block diagram illustrating a configuration of principal parts of an optical fiber characteristics measurement apparatus according to a first embodiment of the present invention.

FIG. 1 is a block diagram illustrating a configuration of principal parts of an optical fiber characteristics measurement apparatus according to a first embodiment of the present invention. As illustrated in FIG. 1, the optical fiber characteristics measurement apparatus 1 according to the present embodiment includes a light source 11, an optical splitter 12 (incident part), an optical modulator 13 (incident part, shifting part), a pulse modulator 14 (incident part), a directional coupler 15 (incident part), a light detector 16 (light detection part), a detection device 17 (detection part), and a control device 18. The optical fiber characteristics measurement apparatus 1 measures characteristics (e.g., a temperature distribution, a strain distribution, and the like) of a measurement optical fiber FUT in the longitudinal direction.

The optical fiber characteristic measurement apparatus 1 according to the present embodiment is a so-called BOCDA optical fiber characteristics measurement apparatus that measures characteristics of the measurement optical fiber FUT on the basis of scattering light obtained by making probe light L1 (continuous light) be incident from one end of the measurement optical fiber FUT and making pump light L2 (pulsed light) be incident from the other end of the measurement optical fiber FUT. Meanwhile, the pump light L2 is light obtained by pulsing a laser beam as frequency-modulated continuous light. In addition, the aforementioned scattering light is scattering light affected by the stimulated Brillouin scattering phenomenon in the measurement optical fiber FUT (stimulated Brillouin scattering light).

The light source 11 includes a semiconductor laser 11a and a signal generator 11b and projects a frequency modulated laser beam at a predetermined modulation frequency $f_m$ under the control of the control device 18. Here, the semiconductor laser 11a may be, for example, a small multi-quantum well distributed feedback laser diode (MQW DFB LD) that projects a laser beam with a narrow spectral width, or the like. The signal generator 11b is controlled by the control device 18 and outputs a sinusoidal signal (modulation signal) for frequency modulating the laser beam projected from the semiconductor laser 11a at the modulation frequency $f_m$ to the semiconductor laser 11a. The optical splitter 12 splits the laser beam projected from the light source 11 into two, for example, at an intensity ratio of 1:1.

The optical modulator 13 includes a microwave generator 13a and a single side band (SSB) optical modulator 13b. The optical modulator 13 modulates (shifts an optical frequency) one laser beam after splitting by the optical splitter 12 and generates a side band (single side band) with respect to a center frequency of the laser beam under the control of the control device 18. Meanwhile, it is assumed that single-side-band waves of a low frequency side are output from the optical modulator 13 in the present embodiment.

The microwave generator 13a is controlled by the control device 18 and outputs microwaves having a frequency corresponding to a frequency shift provided to one laser beam after splitting by the optical splitter 12. Meanwhile, the frequency of the microwaves output from the microwave generator 13a is variable according to control of the control device 18. The SSB optical modulator 13b generates single-side-band waves having a frequency difference equal to the frequency of the microwaves output from the microwave generator 13a with respect to a center frequency of input light. The light modulated by the optical modulator 13 is incident into the measurement optical fiber FUT from one end of the measurement optical fiber FUT as the probe light L1 (continuous light).

The pulse modulator 14 includes a signal generator 14a and a light intensity modulator 14b. The pulse modulator 14 generates pulsed light by pulsing the other laser beam split by the optical splitter 12 under the control of the control device 18. The signal generator 14a is controlled by the control device 18 and outputs a timing signal for defining a timing at which a laser beam is pulsed. The light intensity modulator 14b may be, for example, an electro-optic (EO) switch and pulses the laser beam from the optical splitter 12 at the timing defined by the timing signal output from the signal generator 14a.

Here, the pulse modulator 14 may generate a pulsed light having a pulse width $t_{pw}$ represented by the following equation (2) in a period T represented by the following equation (1). Here, in the following equations (1) and (2), L is the length (length from one end to the other end) of the measurement optical fiber FUT, n is a refractive index of the measurement optical fiber FUT, c is the velocity of light, $d_m$ is an interval of correlation peaks formed in the measurement optical fiber FUT, and $f_m$ is the modulation frequency of the laser beam projected from the light source 11.

$$T \geq T1 + T2 = (2 \times L)/(c/n) + 2 \times t_{pw} \quad (1)$$

$$t_{pw} = (2 \times d_m)/(c/n) = 1/f_m \quad (2)$$

That is, the period T in which the pulse modulator 14 generates a pulsed light is set to a time obtained by adding a time width $t_{pw}$ (period T2) of the pulsed light to a time (period T1) obtained by adding a time width $t_{pw}$ of the pulsed light to a time $t_{rt}$ required for the pulsed light to reciprocate between one end and the other end of the measurement optical fiber FUT.

The directional coupler 15 makes the pulsed light output from the pulse modulator 14 be incident into the measurement optical fiber FUT from the other end of the measurement optical fiber FUT as the pump light L2. In addition, the directional coupler 15 projects light (detection light L11) including the probe light L1, which propagates through the measurement optical fiber FUT and is projected from the other end of the measurement optical fiber FUT, toward the light detector 16. Meanwhile, the intensity of the detection light L11 is affected by the stimulated Brillouin scattering phenomenon occurring in the measurement optical fiber FUT.

The light detector 16 may include, for example, a high-sensitivity light-receiving element such as an avalanche photodiode. The light detector 16 detects (receives) the aforementioned detection light L11 (light that is projected from the other end of the measurement optical fiber FUT and passes through the directional coupler 15) and outputs a detection signal D1. Meanwhile, the light detector 16 includes an optical wavelength filter in addition to the aforementioned light-receiving element although illustration thereof is omitted in FIG. 1, selects only a side band of a low frequency side with respect to the probe light L1 from the detection light L11 and detects the power thereof. Meanwhile, the aforementioned optical wavelength filter may be omitted because the SSB optical modulator 13b is used in the present embodiment. However, unnecessary frequency components can be suppressed by providing the optical wavelength filter although costs increase, and thus measurement accuracy can be further improved.

The detection device 17 includes a timing adjuster 17a, an amplifier 17b (polarity reversing part), and an integrator 17c. The detection device 17 performs detection of the detection signal D1 output from the light detector 16 under the control of the control device 18. Specifically, the detection device 17 integrates the detection signal D1 for a predetermined time to obtain an integrated value in each of the period T1 (first period) in which scattering light (stimulated Brillouin scattering light) based on the probe light L1 and the pump light L2 can be projected from the measurement optical fiber FUT and the period T2 (second period) shorter than the period T1, in which the stimulated Brillouin scattering light cannot be projected from the measurement optical fiber FUT. Such an integrated value is obtained in order to improve measurement accuracy while reducing a time required to measure characteristics of the measurement optical fiber FUT to one shorter than a conventional one.

Here, the aforementioned period T1 is a period from when the pump light L2 is incident into the measurement optical fiber FUT until a time obtained by adding the time width (pulse width $t_{pw}$) of the pump light L2 to the time L1 required for the pump light L2 to reciprocate through the measurement optical fiber FUT elapses. In addition, the aforementioned period T2 may be, for example, a period from a point in time at which the period T1 has elapsed until a time obtained by adding a time required to reset the integrator 17c to the time width of the pump light L2 elapses. Meanwhile, if the time required to reset the integrator 17c is sufficiently shorter than the time width of the pump light L2, the time required to reset the integrator 17c may be ignored. In addition, the predetermined time for which the detection signal D1 is integrated may be, for example, a time corresponding to the time width of the pump light L2. Hereinafter, the predetermined time for which the detection signal D1 is integrated will be referred to as "unit integration time."

The timing adjuster 17a may be realized, for example, by an electric switch (high-speed analog switch) that can perform switching between an on state (a state in which the detection signal D1 is allowed to pass through) and an off state (a state in which the detection signal D1 is blocked) at a high speed. The on state and the off state of this timing adjuster 17a are controlled by the control device 18 such that the timing adjuster 17a cuts out the detection signal D1 using a predetermined time (e.g., the aforementioned unit integration time) as a unit. Here, cutting out means extracting a necessary part from a temporally continuous signal. For example, the timing adjuster 17a may be in the on state from a point in time designated by the control device 18 until the aforementioned unit integration time elapses in the aforementioned period T1. In addition, the timing adjuster 17a may be in the on state from a starting point in time to an end point in time (for the time width of the pump light L2) in the aforementioned period T2.

Here, it is desirable that the timing adjuster 17a be able to cut out the detection signal D1 at a time interval of about several nsec and have low loss (e.g., 1 dB or less). If the detection signal can be cut out at a time interval of about several nsec, it is possible to allow the detection signal to pass through without deteriorating the time width $t_{pw}$ (e.g., 100 ns) of the pulsed light. In addition, low loss does not cause an S/N ratio to be considerably decrease, and thus measurement accuracy can be improved. Furthermore, device size reduction and cost reduction can be achieved by using the electric switch as the timing adjuster 17a, and measurement can be performed in a wide temperature range of about −40 to +80° C. without causing deterioration of stability and repeatability because the electric switch does not have polarization dependence of an optical switch.

The amplifier 17b amplifies a detection signal D2 (a detection signal on which cutting out has been performed by the timing adjuster 17a) that has passed through the timing adjuster 17a under the control of the control device 18. For example, the amplifier 17b may amplify the detection signal D2 on which cutting out has been performed in the period T1 with a gain "1" (output the detection signal D2 without reversing the polarity thereof) on the basis of a control signal SY (refer to FIG. 4) output from the control device 18 and amplify the detection signal D2 on which cutting out has been performed in the period T2 with a gain "−1" (reverse the polarity of the detection signal D2 and output it). Meanwhile, the polarities of the aforementioned gains for the detection signal D2 on which cutting out has been performed in the periods T1 and T2 may be opposite, and the absolute value of the gains may be other than "1."

The integrator 17c integrates an output signal S2 output from the amplifier 17b (a signal cut out by the timing adjuster 17a and amplified by the amplifier 17b) under the control of the control device 18. For example, the integrator 17c may integrate the output signal S1 from a point in time designated by the control device 18 until the unit integration time elapses in the period T1. In addition, the integrator 17c may integrate the output signal S1 from a starting point in time to an end point in time (for a time width of the pump light L2) in the period T2. Meanwhile, the integrator 17c can be reset by control of the control device 18. Further, an integration result of the integrator 17c is converted into a digital signal by an A/D (analog/digital) converter which is not illustrated and output to the control device 18.

The control device 18 integrally controls the operation of the optical fiber characteristics measurement apparatus 1. For example, the control device 18 may control the signal generator 11b provided in the light source 11 such that the modulation frequency $f_m$ of continuous light output from the light source 11 is changed. In addition, the control device 18 may control the microwave generator 13a provided in the optical modulator 13 such that a frequency of a side band (single side band) of the probe light L1 is changed. Further, the control device 18 may control the signal generator 14a provided in the pulse modulator 14 such that a timing at which a laser beam after splitting by the optical splitter 12 is pulsed is controlled. In addition, the control device 18 may control the timing adjuster 17a, the amplifier 17b, and the integrator 17c provided in the detection device 17 such that cutting out of the detection signal D1, the polarity of the detection signal D2, and integration of the output signal S1 are controlled.

Furthermore, the control device 18 includes a calculator 18a (detection part). The calculator 18a detects stimulated Brillouin scattering light by performing a predetermined calculation on a measured value V1 output from the detection device 17 (an integrated value output from the integrator 17c). For example, the calculator 18a may obtain stimulated Brillouin scattering light by adding the measured value V1 obtained in the period T1 to a measured value V2 obtained in the period T2. Meanwhile, the calculator 18a of the control device 18 may be provided in the detection device 17.

<Operation of Optical Fiber Characteristics Measurement Apparatus>

Figure 2:
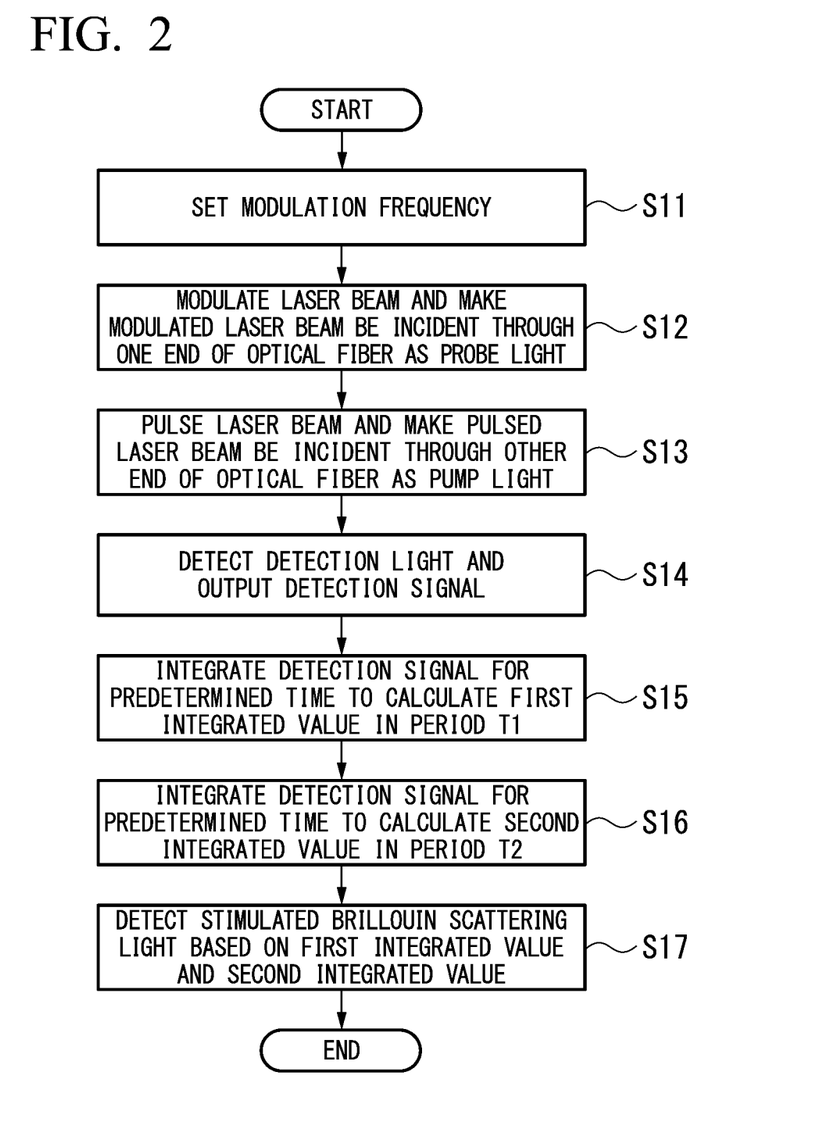
FIG. 2 is a flowchart illustrating an operation example of the optical fiber characteristics measurement apparatus according to the first embodiment of the present invention.

FIG. 2 is a flowchart illustrating an operation example of the optical fiber characteristics measurement apparatus according to the first embodiment of the present invention. Meanwhile, the flowchart illustrated in FIG. 2 is started, for example, when start of measurement of the optical fiber characteristics measurement apparatus 1 is instructed and is repeated at specific intervals when characteristics of the measurement optical fiber FUT are measured in the longitudinal direction. In a case where processing of the flowchart illustrated in FIG. 2 is repeated, for example, processing is repeated in the period T represented by the aforementioned equation (1).

When start of measurement of the optical fiber characteristics measurement apparatus 1 is instructed, the optical fiber characteristics measurement apparatus 1 starts processing of the flowchart illustrated in FIG. 2. First, the control device 18 of the optical fiber characteristics measurement apparatus 1 sets a modulation frequency (step S11). Here, it is assumed that a preset initial value is set as the modulation frequency $f_m$. When the modulation frequency $f_m$ is set, the control device 18 controls the signal generator 11b provided in the light source 11 such that a sinusoidal signal (modulation signal) is output from the signal generator 11b. When this sinusoidal signal is input to the semiconductor laser 11a, the semiconductor laser 11a projects a laser beam as continuous light frequency modulated at the modulation frequency $f_m$.

The laser beam projected from the semiconductor laser 11a is incident into the optical splitter 12. The optical splitter 12 splits the laser beam into two. One laser beam after splitting by the optical splitter 12 is incident into the optical modulator 13. The SSB optical modulator 13b modulates one laser beam after splitting by the optical splitter 12 using a signal output from the microwave generator 13a. Accordingly, a side band (single side band) with respect to the center frequency of the laser beam is generated. The light modulated by the optical modulator 13 is incident into the measurement optical fiber FUT from one end of the measurement optical fiber FUT as the probe light L1 (step S12).

On the other hand, the other laser beam split by the optical splitter 12 is incident into the pulse modulator 14. The light intensity modulator 14b pulses the other laser beam after splitting by the optical splitter 12 through intensity modulation. Specifically, pulsed light having the pulse width $t_{pw}$ represented by the aforementioned equation (2) is generated. This pulsed light is incident into the measurement optical fiber FUT from the other end of the measurement optical fiber FUT as the pulse light L2 through the directional coupler 15 (step S13). Meanwhile, although step S13 is illustrated after step S12 in FIG. 2 in order to facilitate understanding, processes of steps S12 and S13 are performed in parallel.

Figure 3:
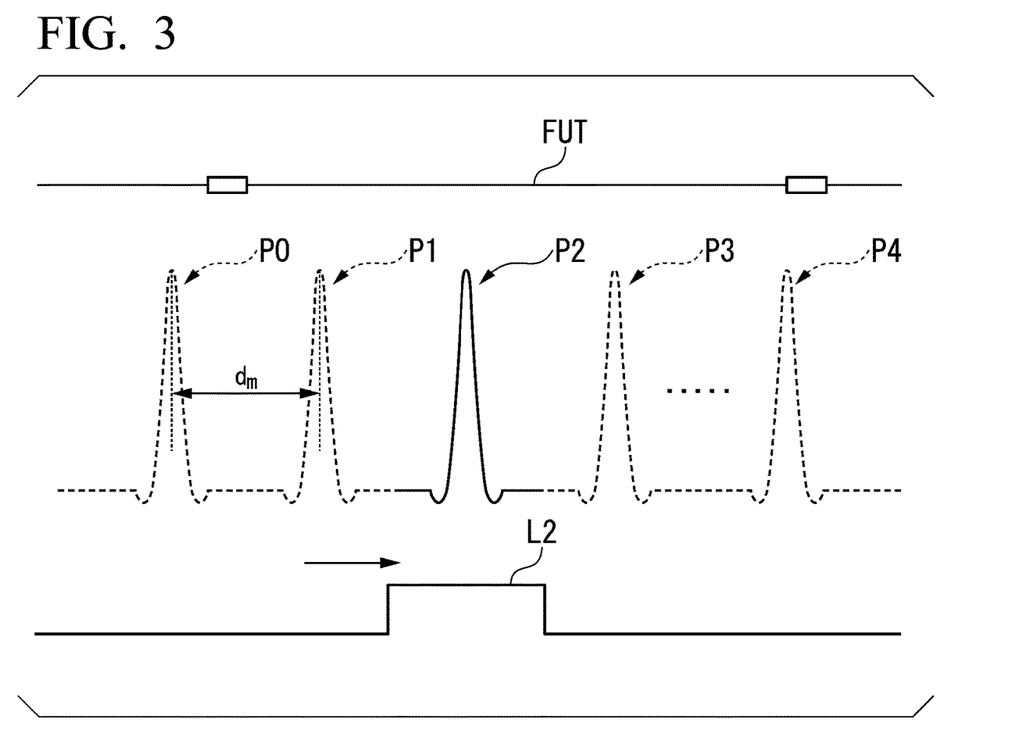
FIG. 3 is a diagram illustrating a state in which correlation peaks appear in an optical fiber as pump light propagates.

When the probe light L1 as continuous light and the pump light L2 as pulsed light, both frequency modulated at the modulation frequency $f_m$, is incident into the measurement optical fiber FUT, correlation peaks P0 to P4 appear at different positions in the measurement optical fiber FUT as the pump light L2 propagates in the measurement optical fiber FUT, as illustrated in FIG. 3. FIG. 3 is a diagram illustrating a state in which correlation peaks appear in the optical fiber as the pump light propagates.

Meanwhile, only five correlation peaks P0 to P4 are illustrated in FIG. 3 in order to avoid complicated illustration. In addition, a state in which the pump light L2 passes the vicinity of the correlation peak P2 is illustrated in the example shown in FIG. 3. In FIG. 3, the correlation peaks P0 and P1 represented by dotted lines are correlation peaks appearing in the past and the correlation peaks P3 and P4 are correlation peaks appearing hereinafter as the pump light L2 propagates.

Meanwhile, an interval $d_m$ of the correlation peaks is represented by the following equation (3).

$$d_m = (c/n)/(2 \times f_m) \quad (3)$$

That is, if the modulation frequency $f_m$ in the light source 11 is changed, the interval $d_m$ of correlation peaks can be changed and positions at which correlation peaks P1 to Pn appear can be moved. However, the 0-order correlation peak P0 appearing at a position at which an optical path difference between the probe light L1 and the pump light L2 becomes 0 cannot be moved even when the modulation frequency $f_m$ is changed. Accordingly, the position at which the 0-order correlation peak P0 appears is set such that it is located outside the measurement optical fiber FUT, as illustrated in FIG. 3.

At the positions of the correlation peaks P1 to P4, the probe light L1 obtains a gain according to stimulated Brillouin amplification using the pump light L2. By changing a frequency difference between the pump light L2 and the probe light L1, a spectrum called a Brillouin gain spectrum (BGS) at the positions of the correlation peaks in the form of a Lorentz function having a Brillouin frequency shift $v_B$ as a center frequency is obtained. It is known that this Brillouin frequency shift $v_B$ changes depending on the material, temperature, strain, and the like of the measurement optical fiber FUT and, particularly, linearly changes with respect to strain and temperature. Accordingly, it is possible to obtain a strain amount or a temperature of the measurement optical fiber FUT by detecting a peak frequency of the Brillouin gain spectrum.

The probe light L1 that has passed through the measurement optical fiber FUT and the stimulated Brillouin scattering light generated in the measurement optical fiber FUT are projected from the other end of the measurement optical fiber FUT and then are incident into the light detector 16 as the detection light L11 through the directional coupler 15. Then, light of a side band on a low frequency side is selected through an optical wavelength filter included in the light detector 16, which is not illustrated, the intensity of the light is detected, and the detection signal D1 representing a detection result is output from the light detector 16 (step S14). The detection signal D1 output from the light detector 16 is input to the detection device 17.

Figure 4:
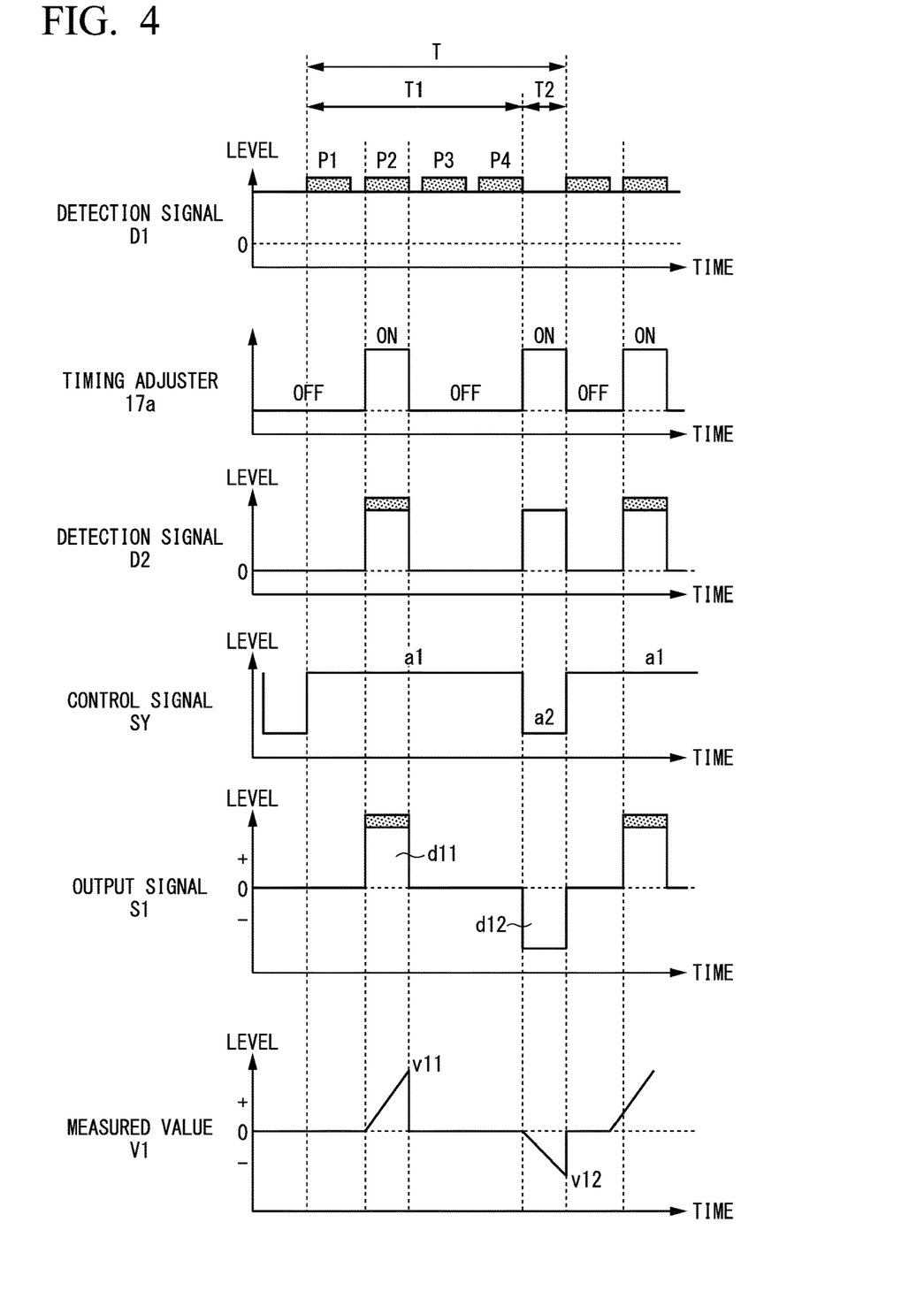
FIG. 4 is a diagram for describing processing performed in a detection device in the first embodiment of the present invention.

FIG. 4 is a diagram for describing processing performed by the detection device in the first embodiment of the present invention. Meanwhile, it is assumed that the period T in which the pump light L2 is incident into the other end of the measurement optical fiber FUT is set to a period in which the equal sign is established in the aforementioned equation (1) in order to facilitate the following description. That is, it is assumed that the period T is set to a time obtained by adding the time width $t_{pw}$ (period T2) of the pulsed light to the time (period T1) obtained by adding the time width $t_{pw}$ of the pulsed light to the time $t_{rt}$ required for the pump light L2 to reciprocate between one end and the other end of the measurement optical fiber FUT. Here, the period T1 is a period in which scattering light (stimulated Brillouin scattering light) based on the probe light L1 and the pump light L2 can be projected from the measurement optical fiber FUT and the period T2 is a period shorter than the period T1, in which the scattering light cannot be projected from the measurement optical fiber FUT.

In the period T1, the detection light L11 including the probe light L1 that has passed through the measurement optical fiber FUT and the stimulated Brillouin scattering light generated in the measurement optical fiber FUT are incident into the light detector 16. Accordingly, the detection signal D1 affected by the stimulated Brillouin scattering light is output from the light detector 16, as illustrated in FIG. 4. Meanwhile, in FIG. 4, parts affected by stimulated Brillouin scattering light are represented by a black band, and parts denoted by signs P1 to P4 respectively represent parts affected by stimulated Brillouin scattering lights generated at the positions of the correlation peaks P1 to P4 in FIG. 3.

On the other hand, in the period T2, the detection light L11 that includes the probe light L1 that has passed through the measurement optical fiber FUT but does not include stimulated Brillouin scattering light is incident into the light detector 16. Accordingly, the detection signal D1 which is not affected by stimulated Brillouin scattering light (to which a black band is not attached) is output from the light detector 16, as illustrated in FIG. 4.

When the detection signal D1 is input to the detection device 17, first, processing of integrating the detection signal in the period T1 for a predetermined time to calculate an integrated value (first integrated value) is performed (step S15). For example, it is assumed that a measurement point with respect to the measurement optical fiber FUT is set to the position of the correlation peak P2 illustrated in FIG. 3. Then, the on state and the off state of the timing adjuster 17a are switched such that parts of the detection signal D1 output from the light detector 16, which have been affected by stimulated Brillouin scattering lights generated at the position of the correlation peak P2 and the vicinity thereof, pass through according to control of the control device 18, as illustrated in FIG. 4. Accordingly, the detection signal D2 cut out using the unit integration time as a unit, illustrated in FIG. 4, is output from the timing adjuster 17a.

The detection signal D2 output from the timing adjuster 17a is amplified by the amplifier 17b and output as the output signal S1. For example, the detection signal D2 may be amplified with a gain a1 (e.g., a gain "1") on the basis of a control signal SY illustrate in FIG. 4 and output as the output signal S1. The output signal S1 output from the amplifier 17b is integrated by the integrator 17c. For example, the output signal S1 may be integrated from a rising point in time thereto to a falling point in time (from a rising point in time thereof until the unit integration time elapses). The integration result of the integrator 17c is output to the control device 18 as the measured value V1. Meanwhile, when the integration result of the integrator 17c is output to the control device 18, the integrator 17c is reset according to control of the control device 18.

Next, processing of integrating the detection signal in the period T2 for a predetermined time to calculate an integrated value (second integrated value) is performed (step S16). For example, the timing adjuster 17a is in the on state from when the period T1 has elapsed until the time width of the pump light L2 elapses according to control of the control device 18, as illustrated in FIG. 4. Accordingly, the detection signal D2 cut out using the unit integration time as a unit, illustrated in FIG. 4, is output from the timing adjuster 17a. However, it is noted that the cut-out detection signal D2 is a signal which is not affected by stimulated Brillouin scattering light (to which a black band is not attached).

The detection signal D2 output from the timing adjuster 17a is amplified by the amplifier 17b and output as the output signal S1. For example, the detection signal D2 may be amplified with a gain a2 (e.g., a gain "−1") on the basis of the control signal SY illustrated in FIG. 4 and output as the output signal S1. The output signal S1 output from the amplifier 17b is integrated by the integrator 17c. For example, the output signal S1 may be integrated from a rising point in time thereto to a falling point in time (from a rising point in time thereof until the unit integration time elapses). The integration result of the integrator 17c is output to the control device 18 as the measured value V1. Meanwhile, when the integration result of the integrator 17c is output to the control device 18, the integrator 17c is reset according to control of the control device 18.

When the above-described processing ends, the calculator 18a of the control device 18 detects stimulated Brillouin scattering light on the basis of the integrated value (first integrated value) obtained in step S15 and the integrated value (second integrated value) obtained in step S16 (step S17). For example, the calculator 18a may perform processing of adding an integrated value (v11) obtained in step S15 to an integrated value (v12) obtained in step S16. By performing this processing, a value acquired by integrating a signal d11 corresponding to a detection signal acquired by detecting only the probe light L1 in the period T1 and a value acquired by integrating a signal d12 corresponding to a detection signal acquired by detecting only the probe light L1 in the period T2 offset each other. The values acquired by integrating the signals d11 and d12 are offset each other so that a value obtained by the calculator 18a indicates a level of stimulated Brillouin scattering light.

A Brillouin gain spectrum at the position of the correlation peak P2 is obtained by repeating the above-described processing while sweeping the frequency of microwaves output from the microwave generator 13a under the control of the control device 18. Then, characteristics (e.g., a strain amount) and the like of the measurement optical fiber FUT at the position of the correlation peak P2 are obtained by detecting a peak frequency of the Brillouin gain spectrum. In addition, the control device 18 repeats the above-described operation while changing the position of the measurement point set in the measurement optical fiber FUT by varying the modulation frequency fin, cutting-out timing of the timing adjuster 17a, and the integration range of the integrator 17c. Accordingly, the optical fiber characteristics measurement apparatus 1 can measure characteristics of the measurement optical fiber FUT in the longitudinal direction.

As described above, the optical fiber characteristics measurement apparatus 1 of the present embodiment makes the probe light L1 as frequency-modulated continuous light and the pump light L2 as frequency-modulated pulsed light respectively are incident from one end and the other end of the measurement optical fiber FUT, detects light projected from the measurement optical fiber FUT and outputs the detected light as a detection signal. Then, the optical fiber characteristics measurement apparatus 1 of the present embodiment detects stimulated Brillouin scattering light on the basis of the first integrated value acquired by integrating a detection signal for a predetermined time in the period T1 in which stimulated Brillouin scattering light based on the probe light L1 and the pump light L2 can be projected from the measurement optical fiber FUT and the second integrated value acquired by integrating the detection signal for a predetermined time in the second period T2 shorter than the period T1, in which stimulated Brillouin scattering light cannot be projected from the measurement optical fiber FUT.

Accordingly, it is possible to reduce a time required to measure characteristics of the measurement optical fiber and improve measurement accuracy compared to conventional technologies. Specifically, in a conventional technology, a time of ("time $t_{rt}$ required for the pump light L2 to reciprocate through the measurement optical fiber FUT"+"width of the pump light L2 (time width) $t_{pw}$")×2 is required to perform measurement of a single measurement point. On the other hand, in the present embodiment, it is possible to perform measurement of a single measurement point within a time of "time $t_{rt}$ required for the pump light L2 to reciprocate through the measurement optical fiber FUT"+ ("width of the pump light L2 (time width) $t_{pw}$")×2.

Meanwhile, a time t0 conventionally required to perform measurement of a single measurement point and a time t1 required in the present embodiment are represented by mathematical expressions as follows.

$$t0=(t_{rt}+t_{pw})\times 2$$

$$t1=t_{rt}t_{pw}\times 2$$

Second Embodiment

An optical fiber characteristic measurement apparatus of the present embodiment has almost the same configuration as the optical fiber characteristics measurement apparatus 1 illustrated in FIG. 1. In addition, the operation of the optical fiber characteristics measurement apparatus of the present embodiment is mostly the same as the operation of the optical fiber characteristics measurement apparatus 1 illustrated in FIG. 1 and is basically performed according to the flowchart illustrated in FIG. 2. However, operations performed by the detection device 17 and the control device 18 are different in the optical fiber characteristics measurement apparatus of the present embodiment and the optical fiber characteristics measurement apparatus 1 illustrated in FIG. 1. Hereinafter, the operations performed by the detection device 17 and the control device 18 will be mainly described in detail.

Figure 5:
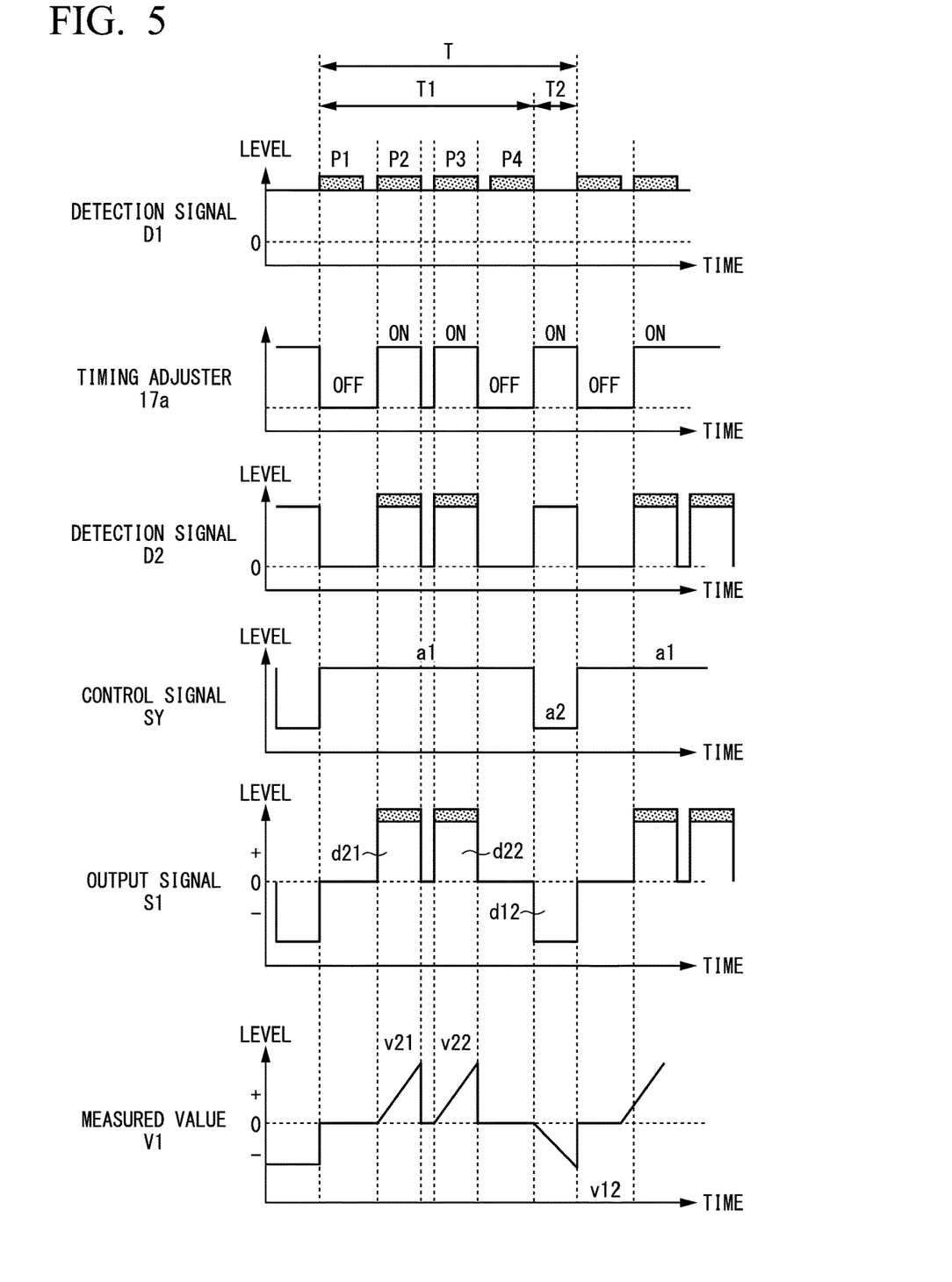
FIG. 5 is a diagram for describing processing performed in a detection device in a second embodiment of the present invention.

FIG. 5 is a diagram for describing processing performed by the detection device in the second embodiment of the present invention. Meanwhile, it is assumed that the detection signal D1 output from the light detector 16 is the same as that in the first embodiment in order to facilitate description. In the above-described first embodiment, only a part affected by stimulated Brillouin scattering light generated at a position of one correlation peak (e.g., the correlation peak P2) and the vicinity thereof is cut out and integrated to calculate only one integrated value (first integrated value) through the process of step S15. On the other hand, in the present embodiment, parts affected by stimulated Brillouin scattering light generated at positions of a plurality of correlation peaks (e.g., correlation peaks P2 and P3 in the example illustrated in FIG. 5) and the vicinity thereof are cut out and the cut-out parts are individually integrated to calculate a plurality of integrated values (first integrated values) through the process of step S15.

Specifically, measurement points with respect to the measurement optical fiber FUT are set to the positions of the correlation peaks P2 and P3 illustrated in FIG. 3, for example. Then, the on state and off state of the timing adjuster 17a are switched such that a part of the detection signal D1 output from the light detector 16, which is affected by stimulated Brillouin scattering light generated at the position of the correlation peak P2 and the vicinity thereof, passes through and then a part affected by stimulated Brillouin scattering light generated at the position of the correlation peak P3 and the vicinity thereof passes through according to control of the control device 18, as illustrated in FIG. 5. Accordingly, the detection signal D2 cut out at a plurality of different points in time using the unit integration time as a unit, illustrated in FIG. 5, is output from the timing adjuster 17a.

The detection signal D2 output from the timing adjuster 17a is amplified by the amplifier 17b and output as the output signal S1. For example, the detection signal D2 may be amplified with a gain a1 (e.g., gain "1") on the basis of the control signal SY illustrated in FIG. 5 and output as the output signal S1. The output signal S1 output from the amplifier 17b is individually integrated by the integrator 17c. For example, a part of the output signal S1, which is affected by stimulated Brillouin scattering light generated at the position of the correlation peak P2 and the vicinity thereof, and a part affected by stimulated Brillouin scattering light generated at the position of the correlation peak P3 and the vicinity thereof are individually integrated from each rising point in time to falling point in time (from each rising point in time until the unit integration time elapses). Meanwhile, respective integration results are sequentially output to the control device 18 as a measured value V1. Whenever an integration result of the integrator 17c is output to the control device 18, the integrator 17c is reset according to control of the control device 18.

Subsequently, processing of integrating the detection signal in the period T2 for a predetermined time to calculate an integrated value (second integrated value) is performed as in the first embodiment (step S16). Meanwhile, this processing is the same as that in the first embodiment and thus description thereof is omitted. When the above processing ends, processing of detecting stimulated Brillouin scattering light is performed by the calculator 18a of the control device 18 on the basis of the integrated values (first integrated values) obtained in step S15 and the integrated value (second integrated value) obtained in step S16 (step S17).

Specifically, processing of adding an integrated value (v21) obtained in step S15 to an integrated value (v12) obtained in step S16 is performed and processing of adding an integrated value (v22) obtained in step S15 to the integrated value (v12) obtained in step S16 is performed. By performing this processing, a value acquired by integrating a signal d21 corresponding to a detection signal acquired by detecting only the probe light L1 in the period T1 and a value acquired by integrating a signal d12 corresponding to a detection signal acquired by detecting only the probe light L1 in the period T2 offset each other. In addition, a value acquired by integrating a signal d22 corresponding to a detection signal acquired by detecting only the probe light L1 in the period T1 and the value acquired by integrating the signal d12 corresponding to the detection signal acquired by detecting only the probe light L1 in the period T2 offset each other. The value acquired by integrating the signals d21 and the value acquired by integrating the signal d12 are offset each other and value acquired by integrating the signals d22 and the value acquired by integrating the signal d12 are offset each other so that a value obtained by the calculator 18a indicates a level of stimulated Brillouin scattering light.

Brillouin gain spectra at the positions of the correlation peaks P2 and P3 are obtained by repeating the above-described processing while sweeping the frequency of microwaves output from the microwave generator 13a under the control of the control device 18. Then, characteristics (e.g., a strain amount) and the like of the measurement optical fiber FUT at the positions of the correlation peaks P2 and P3 are obtained by detecting peak frequencies of the Brillouin gain spectra. In addition, the control device 18 repeats the above-described operation while changing the positions of the measurement points set in the measurement optical fiber FUT by varying the modulation frequency $f_m$, cutting-out timing of the timing adjuster 17a, and the integration range of the integrator 17c. Accordingly, the optical fiber characteristics measurement apparatus 1 can measure characteristics of the measurement optical fiber FUT in the longitudinal direction.

As described above, the optical fiber characteristics measurement apparatus 1 of the present embodiment obtains a plurality of first integrated values at a plurality of different points in time in the period T1 in which stimulated Brillouin scattering light based on the probe light L1 and the pump light L2 can be projected from the measurement optical fiber FUT. Then, the optical fiber characteristics measurement apparatus 1 of the present embodiment detects stimulated Brillouin scattering light on the basis of the plurality of first integrated values and the second integrated value obtained in the period T2 shorter than the period T1, in which stimulated Brillouin scattering light cannot be projected from the measurement optical fiber FUT. Accordingly, it is possible to reduce a time required to measure characteristics of the measurement optical fiber to be less than that in the first embodiment. For example, when N (N is an integer equal to or greater than 2) first integrated values are obtained in the period T1, the time required to measure characteristics of the measurement optical fiber can be reduced to 1/N of that in the first embodiment.

Third Embodiment

Figure 6:
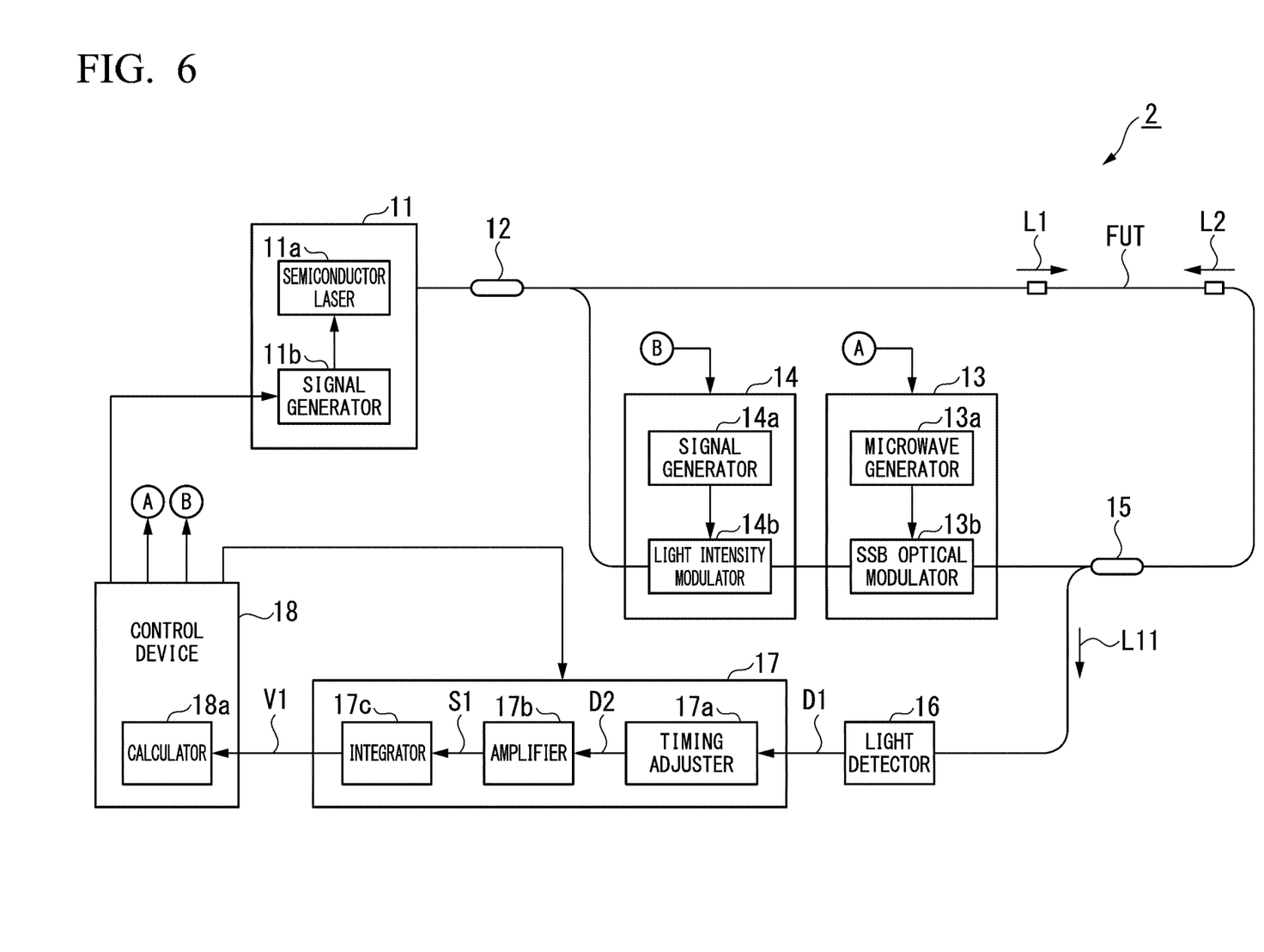
FIG. 6 is a block diagram illustrating a configuration of principal parts of an optical fiber characteristics measurement apparatus according to a third embodiment of the present invention.

FIG. 6 is a block diagram illustrating a configuration of principal parts of an optical fiber characteristics measurement apparatus according to a third embodiment of the present invention. As illustrated in FIG. 6, the optical fiber characteristics measurement apparatus 2 of the present embodiment has a configuration in which the optical modulator 13 included in the optical fiber characteristics measurement apparatus 1 illustrated in FIG. 1 is provided between the pulse modulator 14 and the directional coupler 15.

The optical fiber characteristics measurement apparatus 1 illustrated in FIG. 1 causes the probe light L1 that is incident from one end of the measurement optical fiber FUT to generate single-side-band waves. On the other hand, the optical fiber characteristics measurement apparatus 2 of the present embodiment causes the pump light L2 that is incident from the other end of the measurement optical fiber FUT to generate single-side-band waves. In the present embodiment, it is assumed that single-side-band waves of a high frequency side are output from the optical modulator 13. Meanwhile, the optical modulator 13 may be provided between the optical splitter 12 and the pulse modulator 14.

In the optical fiber characteristics measurement apparatus 1 illustrated in FIG. 1, the optical modulator 13 is provided on the optical path of the probe light L1 split by the optical splitter 12 and the pulse modulator 14 is provided on the optical path of the pump light L2 split by the optical splitter 12. Accordingly, there are cases in which the respective optical paths require optical amplifiers in order to compensate for optical losses due to the optical modulator 13 and the pulse modulator 14 in the optical fiber characteristics measurement apparatus 1 illustrated in FIG. 1. On the other hand, in the optical fiber characteristics measurement apparatus 2 of the present embodiment, the pulse modulator 14 and the optical modulator 13 are provided on the optical path of the pump light L2 split by the optical splitter 12 and the optical modulator 13 is not provided on the optical path of the probe light L1. Accordingly, optical loss of the probe light L1 due to optical modulator 13 does not occur in the optical fiber characteristics measurement apparatus 2 of the present embodiment, and thus a low-cost configuration in which an optical amplifier need not be provided on the optical path of the probe light L1 can be realized if power of a laser beam output from the light source is sufficient.

Although the optical fiber characteristics measurement apparatus and optical fiber characteristics measurement methods according to embodiments of the present invention have been described above, the present invention is not limited to the above-described embodiments and can be freely modified within the scope of the present invention. For example, an example in which an integration result of the integrator 17c is converted into a digital signal through an A/D converter which is not illustrated has been described in the above-described embodiments. However, the detection signal D1 output from the light detector 16 may be converted into a digital signal, and processing of the detection device 17 may be performed as digital processing.

In addition, an example in which the control device 18 changes the polarity of the detection signal D2 by controlling the gain of the amplifier 17b provided in the detection device 17 has been described in the above-described embodiments. However, the amplifier 17b provided in the detection device 17 may be omitted and processing corresponding to reversing of the polarity of the detection signal D2, which is performed through the amplifier 17b, may be performed by the calculator 18a. For example, when the amplifier 17b is omitted, the integrated value (v12) in FIG. 4 has the same polarity as that of the integrated value (v11). Accordingly, if the amplifier 17b can perform a calculation of subtracting the integrated value (v12) from the integrated value (v11), the same results as those in the above-described embodiments are obtained. In addition, although an SSB modulator is used as the shifting part 13 in the above-described embodiments, an intensity modulator may be used.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

REFERENCE SIGNS LIST

11 Light source
12 Optical splitter
13 Optical modulator
14 Pulse modulator
15 Directional coupler
16 Light detector
17 Detection device
17a Timing adjuster
17b Amplifier
17c Integrator
18a Calculator
D1 Detection signal
FUT Measurement optical fiber
L1 Probe light
L2 Pump light
T1, T2 Period

The invention claimed is:

1. An optical fiber characteristic measurement apparatus comprising:
   a light source configured to output a laser beam of which frequency is modulated;
   an incident part configured to make the laser beam output from the light source be incident from one end and another end of an optical fiber as continuous light and pulsed light, respectively;
   a light detector configured to detect light projected from the optical fiber and output a detection signal; and
   a detector configured to detect the scattering light based on integrated values acquired by integrating the detection signal for a predetermined time in a first period and a second period, wherein the first period is a period during which scattering light based on the continuous light and the pulsed light is projected from the optical fiber, and wherein the second period is shorter than the first period and is a period during which the scattering light is not projected from the optical fiber.

2. The optical fiber characteristic measurement apparatus according to claim 1, wherein the detector comprises:
   a timing adjuster configured to cut out the detection signal using the predetermined time as a unit; and
   an integrator configured to integrate the detection signal which has been cut out by the timing adjuster for the predetermined time.

3. The optical fiber characteristic measurement apparatus according to claim 2, wherein the detector further comprises:
   a calculator configured to obtain the scattering light by performing a predetermined calculation on an integrated value of the integrator.

4. The optical fiber characteristic measurement apparatus according to claim 3, wherein the detector further comprises:
   a polarity reversing part configured to reverse a polarity of the detection signal which has been cut out by the timing adjuster in any one of the first period and the second period, and wherein the calculator is configured to obtain the scattering light by adding an integrated value acquired in the first period to an integrated value acquired in the second period.

5. The optical fiber characteristic measurement apparatus according to claim 2,
wherein the timing adjuster is configured to cut out the detection signal using the predetermined time as a unit from a plurality of different points in time in the first period, and
wherein the integrator is configured to individually integrate each of detection signals which have been cut out by the timing adjuster.

6. The optical fiber characteristic measurement apparatus according to claim 1,
wherein the first period is a period from when the pulsed light is incident into the optical fiber to when a time obtained by adding a time width of the pulsed light to a time required for the pulsed light to reciprocate through the optical fiber elapses.

7. The optical fiber characteristic measurement apparatus according to claim 1,
wherein the second period is a period from a point in time at which the first period has elapsed to when the time width of the pulsed light elapses.

8. The optical fiber characteristic measurement apparatus according to claim 1,
wherein the predetermined time is the time width of the pulsed light.

9. The optical fiber characteristic measurement apparatus according to claim 1, wherein the incident part comprises:
a shifting part configured to shift an optical frequency of any one of the continuous light and the pulsed light, and
wherein the scattering light is stimulated Brillouin scattering light.

10. The optical fiber characteristic measurement apparatus according to claim 9, wherein the shifting part comprises:
a microwave generator configured to output microwaves; and
a modulator configured to shift the optical frequency of any one of the continuous light and the pulsed light in response to the microwaves output from the microwave generator.

11. An optical fiber characteristics measurement method comprising:
outputting, by a light source, a laser beam of which frequency is modulated;
making, by an incident part, the laser beam output from the light source be incident from one end and another end of an optical fiber as continuous light and pulsed light, respectively;
detecting, by a light detector, light projected from the optical fiber and outputting a detection signal; and
detecting, by a detector, in a first period in which scattering light based on the continuous light and the pulsed light is projected from the optical fiber and a second period shorter than the first period, in which the scattering light is not projected from the optical fiber, the scattering light based on integrated values acquired by integrating the detection signal for a predetermined time.

12. The optical fiber characteristics measurement method according to claim 11, further comprising:
cutting out, by a timing adjuster of the detector, the detection signal using the predetermined time as a unit; and
integrating, by an integrator of the detector, the detection signal which has been cut out by the timing adjuster for the predetermined time.

13. The optical fiber characteristics measurement method according to claim 12, further comprising:
obtaining, by a calculator of the detector, the scattering light by performing a predetermined calculation on an integrated value of the integrator.

14. The optical fiber characteristics measurement method according to claim 13, further comprising:
reversing, by a polarity reversing part of the detector, a polarity of the detection signal which has been cut out by the timing adjuster in any one of the first period and the second period; and
obtaining, by the calculator, the scattering light by adding an integrated value acquired in the first period to an integrated value acquired in the second period.

15. The optical fiber characteristics measurement method according to claim 12, further comprising:
cutting out, by the timing adjuster, the detection signal using the predetermined time as a unit from a plurality of different points in time in the first period; and
individually integrating, by the integrator, each of detection signals which have been cut out by the timing adjuster.

16. The optical fiber characteristics measurement method according to claim 11,
wherein the first period is a period from when the pulsed light is incident into the optical fiber to when a time obtained by adding a time width of the pulsed light to a time required for the pulsed light to reciprocate through the optical fiber elapses.

17. The optical fiber characteristics measurement method according to claim 11,
wherein the second period is a period from a point in time at which the first period has elapsed to when the time width of the pulsed light elapses.

18. The optical fiber characteristics measurement method according to claim 11,
wherein the predetermined time is the time width of the pulsed light.

19. The optical fiber characteristics measurement method according to claim 11, further comprising:
shifting, by a shifting part of the incident part, an optical frequency of any one of the continuous light and the pulsed light,
wherein the scattering light is stimulated Brillouin scattering light.

20. The optical fiber characteristics measurement method according to claim 19, further comprising:
outputting microwaves by a microwave generator of the shifting part; and
shifting, by a modulator of the shifting part, optical frequency of any one of the continuous light and the pulsed light in response to the microwaves output from the microwave generator.

* * * * *